May 2, 1933. W. A. GIBBONS 1,906,569
FORM FOR RUBBER ARTICLES
Filed Dec. 2, 1927

INVENTORS
Willis A. Gibbons
BY
ATTORNEY

Patented May 2, 1933

1,906,569

UNITED STATES PATENT OFFICE

WILLIS A. GIBBONS, OF GREAT NECK, NEW YORK, ASSIGNOR TO THE NAUGATUCK CHEMICAL COMPANY, OF NAUGATUCK, CONNECTICUT, A CORPORATION OF CONNECTICUT.

FORM FOR RUBBER ARTICLES

Application filed December 2, 1927. Serial No. 237,185.

The present invention relates to the manufacture of rubber articles directly from rubber latex or other aqueous dispersions of rubber, and more particularly to a form or mold on which the rubber is deposited in the shape desired. Heretofore porous earthenware has been proposed as the most suitable material for such purpose, being disclosed in prior patent to Hopkinson and Gibbons 1,542,388, granted June 16, 1925. Such porous earthenware, however, has not the optimum qualifications for manufacturing purposes, being among other things, too fragile and too expensive at least for the commercial manufacture of large articles such as inner tubes.

The present invention aims to provide a new and improved construction of form of either the internal (mandrel) or external (mold) type capable of standing the usage to which it is subjected in commercial production, not too expensive for initial equipment, and permitting rubber articles to be manufactured thereon directly from latex or equivalent dispersion at a sufficiently rapid rate and in the desired condition and shape.

Figure 1:
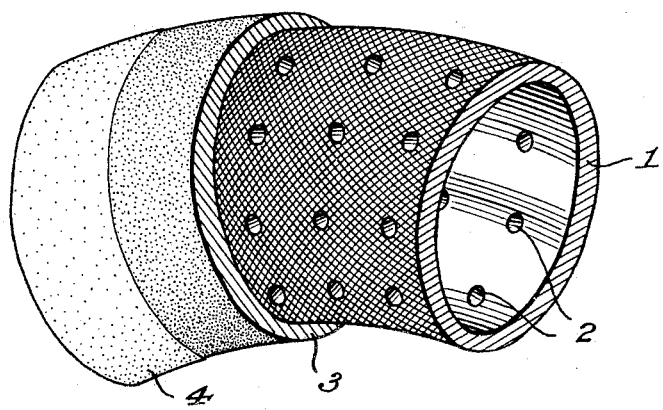
Figure 2:
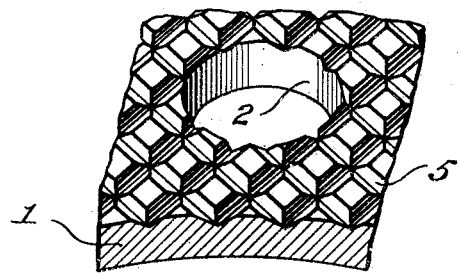

In the drawing a single of the many possible embodiments of the invention is illustrated, Fig. 1 thereof showing a fragment or portion of an internal spiral form or mandrel suitable for the manufacture of inner tubes, and Fig. 2 being an enlarged detail.

The form comprises a hollow support 1 of any suitable material capable of supplying the requisite strength, metal such as aluminum being preferred, in which support are provided apertures 2 of any suitable shape or size and at any suitable intervals.

To the apertured support 1 is applied a filtering means 3 which may consist of paper, plaster, clay, a mixture of diatomaceous earth and a phenyl adlehyde condensation product which upon heating sets or hardens in a tough tenacious condition, or any other material or composition permitting flow of serum from rubber latex or like aqueous dispersion and preventing the passage of the dispersed phase so as to produce an article of rubber of the desired thickness.

If the surface of the filtering means 3 be not as smooth as desirable it may be coated as at 4 with a "slip" or paste of some such comminuted powdered substance as clay or the like and water which is capable of being dried in a porous and filtering condition. Or the surface of the filtering means 3 may be ground or buffed to the requisite smoothness, at least where the nature of the filtering means permits. A slip 4 of finely divided material such as powdered clay, however, is preferred, for obtaining the desired smoothness of wall in the ultimate rubber article, but is not essential where the article to be manufactured does not require such an even or smooth surface.

The various materials which may be used as a filtering means 3 may be applied to the surface 1 in any convenient manner and as required by their nature.

If paper is employed as the filtering means 3, it is preferred to use a high-grade paper pulp of say 4 parts of pulp to 100 of water conditioned by beating for from 4-6 hrs. and to the pulp in the beater may be added pore producing material for instance whiting, in the proportions of 5 parts whiting to 100 parts of the paper pulp. After screening to separate the pulp proper from the larger part of the water, it may be applied to the support 1 by deposition or molding and drying. Instead of applying the paper pulp directly to the support 1, it may be formed into a sheet of porous paper and the paper wrapped directly around the support 1 in spiral convolutions (abutting or overlapping) or in sheet form. It is desirable, however, to apply the pulp or paper in a damp condition. In other words the paper may be deposited or molded directly on to the form or it may be first formed into a sheet and then applied to the form to produce the filtering means 3. Where the paper or pulp is to be deposited directly on the form, the metal support is provided with a considerably greater number of perfortions per unit area than is required when the filtering medium is to be applied by any means other than deposition. On this account it may be desirable to construct the support 1 after perforation of the metal. 400 perforations per square inch give satisfactory results with paper pulp of the type described.

For some purposes, particularly when the articles to be made are small, the filtering means 3 may consist of plaster or clay. These materials may be applied to the support 1 in a plastic condition and dried to form a porous layer or stratum of the desired permeability.

The preferred filtering means 3, however, comprises a pore producing material such as whiting, tripoli flour, clay, magnesia, or diatomaceous earth of which the latter is the most satisfactory and a binding agent preferably of a tough hard character when set such as phenol aldehyde liquid condensation product which upon heating sets or hardens in a tough tenacious condition. Various phenol aldehyde liquid condensation products and similar condensation products are known and exist in a liquid condition which upon application of heat change to a tough hard solid. A pore producing material, such as diatomaceous earth included in those above mentioned, may be mixed with a liquid phenol aldehyde condensation product and the liquid mixture or paste may be applied to a supporting form. It is desirable to distribute the porous material uniformly in the condensation product and such uniformity may be facilitated by thinning the liquid mixture, the thinning serving as well to yield a suitable viscosity for coating. A smooth paste may thus be obtained which may be readily applied to the support 1 which it is advisable to clean thoroughly before coating.

The following is an illustration of one set of proportions which will give satisfactory results:

|  | Parts by weight |
|---|---|
| Liquid phenol aldehyde condensation product (containing about 50% of solid matter) | 50 |
| Diatomaceous earth | 50 |
| Wetting liquid | 140 |

The wetting liquid in the above illustration contains:

|  | Parts by weight |
|---|---|
| Water | 60 |
| N-butyl alcohol | 20 |
| Denatured alcohol | 20 |

To prepare the paste the earth is wet with a portion of the liquid and thoroughly mixed therewith. The liquid condensation product is then added and the mixture is worked to a smooth paste, adding the remainder of the wetting liquid from time to time. The product may be passed through a paint mill or other mixing apparatus in order to furnish a smooth homogeneous paste.

The apertures 2 in the support 1 may be temporarily plugged to exclude the paste therefrom, or the paste may fill the apertures 2. In the latter event the apertures 2 may if desired have undercut walls or sides to afford more positive anchorage of the filtering means 3 to the support 1.

The form which has been coated with the paste of phenol aldehyde condensation product and pore producing material may be dried in any suitable and convenient manner, preferably, however, by heating for about 5 hrs. commencing at about 80° C. and gradually raising the temperature in 3 hrs. up to 130° C. at which last named temperature heat is maintained for about 2 hrs. The form thus produced with a filtering means 3 on one of its surfaces may be used for the manufacture of rubber articles, or may have its surface smoothed by abrasion. After this, if desired, it may be coated with the paste above mentioned—consisting of phenol aldehyde condensation product and a port producing material—which has been thinned to facilitate its application. One or more such coatings of the thinned paste may be applied as by brushing and dried by heating for around 30 min. at 100° C.

Of the phenol aldehyde condensation products, various products which on drying form a tough hard solid may be employed as a binder for the diatomaceous earth or other pore producing material. The material on the market today known as "celite" is the most satisfactory form of diatomaceous earth but all such earths and other materials which will produce a filtering means 3 capable of passing serum but stopping the passage of rubber particles are comprehended within the broad aspects of the invention.

The binding agent of the filtering composition 3 may however be any other substance which assumes a hard and tough condition when set, such for instance as a hard rubber composition containing a large proportion of sulphur. For some purposes, however, a soft rubber composition may be employed as for instance when repeated drying and vulcanizing operations incident to the manufacture of the article on the form or mold would not too speedily break down the vulcanized rubber binder fixing and holding the pore producing material.

In lieu of the wetting liquid in the formula of the preferred construction, other liquids may be used such for instance as mixtures of glycerine and water, or of denatured alcohol and water, or water alone. Generally any wetting liquid may be employed which may be driven off by evaporation with or without heat so as to leave the pore producing material in the composition on the form in a condition permitting serum or water to be abstracted through its mass and the rubber particles to be deposited in a layer on its surface.

For the manufacture of large rubber articles such as inner tubes, it is preferred to provide grooves or channels 5 on that surface of the support 1 to which the filtering means 3 is applied for the purpose of facilitating or speeding up the rate of deposition by allowing the serum or water to pass more freely to the apertures 2 in the support 1 as well as for the purpose of reducing the number of apertures. Such grooves or channels may be most readily, and preferably are, formed by knurling. If such channels or grooves 5 are provided on the surface of the support 1, the filtering means 3 may wholly or partially fill them, and in either case may be of the same or of a more porous character. For instance if knurling is employed, the channels or grooves 5 may be wholly or partially filled with a composition comprising phenol aldehyde liquid condensation product 100 parts, diatomaceous earth 100 parts, a wetting liquid 100 parts, after the formula given in the example accompanying the preferred form of the invention, the paste of the condensation product and pore producing material being dried at 90–100° C. Subsequently, of course, the first mentioned paste containing only 60 parts of diatomaceous earth may be applied as previously detailed.

In the foregoing particular reference has been made to the manufacture of inner tubes upon a form of the spiral mandrel type, i. e. one in which the finished product may be stripped by turning it inside out and pulling it off one of the two free ends of the form. The invention, however, is not limited to a form of the curved type as it may be straight. Or instead of an internal form or mandrel such as illustrated, the form may be of the external type, and either straight or curved. For instance it may resemble a split annular mold in which case of course the support 1 would be located on the outside and the filtering means 3 would be located on the inside. Such reversal of parts, however, is obviously within the principles underlying the invention whose broad aspects comprehend the manufacture of any article of any size and in any shape desired.

Generally the support 1 may be made of any material capable of retaining its shape and supplying the necessary strength for manufacturing operations to the form. Instead of metal mentioned previously as preferably, such materials as wood, indurated fibre, compressed paper, and wire in layers or woven may be employed for such support 1. Generally the number and size of the apertures may be varied within wide limits. For the manufacture of such small articles as finger cots, nipples, or gloves, none or only a few apertures need be provided in the support 1. For the manufacture of larger articles such as inner tubes, with the preferred filtering means 3 of a phenol aldehyde condensation product, it is preferred to locate the apertures about 2 inches apart and to make them of a size of around 1/8″ in diameter (if they be circular). Generally the thickness of the filtering means or layer 3 will be as thin as possible to permit of the proper deposit of rubber from latex or equivalent aqueous dispersion, but the thickness in no case need exceed 1/16 or 1/8 of an inch. If the surface of the support 1 to which the filtering means 3 is applied is provided with channels or grooves the thickness of the filtering layer 3 may be reduced, it being understood that generally the thicker the filtering layer 3 the greater the capacity thereof to permit lateral flow of the serum or water to the apertures 2 and the less the number of such apertures required. Generally it is preferred to finish the surface of the filtering means 3 on which the rubber is to be deposited with clay slip or clay or other aqueous suspension of finely powdered material in order to obtain a smooth surface on the rubber article next to the form. Such "slips" need not be more than a few thousandths of an inch in thickness when dry, and are readily renewable at small cost if marred in use. The use of such "slips" as well as the provisions of channels or grooves 4 is optional, however, but for most purposes and particularly the manufacture of such large articles as inner tubes both these expedients are desirable.

In the use of the apparatus rubber latex or other aqueous dispersion which preferably has been conditioned to increase its rate of filterability in any of the ways disclosed in pending application Serial No. 164,651, filed Jan. 29, 1927, may be applied (externally or internally) to the form or mold of this invention and the rubber content thereof deposited thereon directly in the shape of the finished article. The building up of the layer of rubber on the form may be hastened by electrolytic action, or by applied or hydrostatic pressure on the latex or aqueous dispersion, and in any case with or without the application of less than atmospheric pressure to the side of the form or mold opposite to that on which the rubber is deposited or built up. After the deposit of rubber has built up to the desired thickness, the form may be removed from contact with the latex or dispersion and the article thereon then dried, vulcanized and finished as convenient. The period of drying may be considerably shortened by the use of differential pressure on the fresh deposit, tending to force the liquid from the deposit to the opposite side of the form or mold. In the case of a mandrel type, this may conveniently be done by the application of a vacuum to the interior of the mandrel, and in the case of the external type of mold by the application of air pressure to the interior of the mold. This may be continued also during the vulcanization step and is in many cases desirable in order to insure the rubber layer maintaining during vulcanization the shape originally imparted to it by the form or mold.

The vulcanization may be facilitated by previously incorporating vulcanizing ingredients including accelerators in the latex or dispersion before deposition or it may be effected by the "cold cure" (sulphur chloride) process at least where the wall thickness of the article permits, or it may be effected by diffusion thereinto of a missing ingredient of a complete vulcanizing combination, the remainder of which has been incorporated previously in the latex.

The invention of this application is regarded basic in character and broad in scope. Many changes and alterations may be made beyond those disclosed and all such as are within the principles underlying the invention are intended to be comprehended in the accompanying claims to which reference should be made for an understanding of the scope of the invention.

Having thus described my invention what I claim and desire to protect by Letters Patent is:

1. A form for the manufacture of rubber articles upon which rubber may be deposited from a dispersion thereof, which comprises a shape-retaining support provided with channels on one of its faces, and a filtering portion consisting of porous material and a binder therefor which serves to unite the filtering portion to the channeled surface of said support.

2. A form for the manufacture of rubber articles upon which rubber may be deposited from a dispersion thereof, which comprises a shape-retaining support provided with a grooved surface, and a filtering portion secured to the grooved surface of said support and consisting of porous material and an organic binder therefor.

3. A form for the manufacture of rubber articles upon which rubber may be deposited from a dispersion thereof, which comprises an apertured shape-retaining support provided with grooves communicating with the apertures, and a nonmetallic filtering portion secured to the grooved face of said support and having a deposit receiving surface of the shape of the article to be made and having pores of a size sufficient to permit the passage of the continuous phase but to retain on said surface the disperse phase of the rubber dispersion.

4. A form for the manufacture of rubber articles upon which rubber may be deposited from a dispersion thereof, which comprises an apertured shape retaining support having a grooved face, and a filtering means secured to the grooved face thereof and consisting of porous material bound with an organic substance.

5. A form for the manufacture of rubber articles upon which rubber may be deposited from a dispersion thereof, which comprises an apertured shape-retaining support having a grooved face and filtering means secured to the grooved face thereof and consisting of porous material and a heat hardened binder therefor.

6. A form for the manufacture of rubber articles upon which rubber may be deposited from a dispersion thereof, which comprises an apertured hollow metallic support provided with grooves in one of its faces, filtering means secured to said grooved face of said support, and a smoothing coat of porous material on the surface of the filtering means.

7. A form for the manufacture of rubber articles upon which rubber may be deposited from a dispersion thereof, which comprises a hollow apertured metallic support, substantially permanent filtering means thereon, comprising porous material and a phenol aldehyde binder, said filtering means having a depositing surface of the shape of the article to be made.

8. A form for the manufacture of rubber inner tubes upon which rubber may be deposited from a dispersion thereof, which comprises a spiral shape-retaining tubular support and a filtering portion consisting of porous material and a binder therefor which serves to unite the filtering portion to the support.

9. A form for the manufacture of rubber inner tubes upon which rubber may be deposited from a dispersion thereof, which comprises a spiral shape-retaining tubular support having apertures therethrough and a substantially permanent filtering means secured thereto.

10. A form for the manufacture of rubber inner tubes upon which rubber may be deposited from a dispersion thereof, which comprises a spiral apertured shape-retaining tubular support and a filtering portion secured thereto and consisting of porous material and a binder therefor.

11. A device for manufacturing rubber articles which comprises a metallic support having the form of the article to be manufactured, said support having a knurled surface and being provided with apertures extending therethrough, and a substantially permanent medium for filtering rubber dispersions thereon.

12. A device for manufacturing rubber inner tubes which comprises a hollow cylindrical spiral mandrel having the shape of an inner tube, said mandrel having a knurled surface and being provided with apertures extending therethrough, a filtering medium adapted to filter rubber dispersions, a binding medium for uniting the filtering medium to the mandrel, and means for evacuating the interior of the mandrel.

13. A device for manufacturing rubber articles which comprises a metallic shape-retaining support having the form of the article to be manufactured, said support having a knurled surface and apertures extending therethrough, a medium for filtering rubber dispersions and a binding medium for uniting the filtering medium to the knurled surface.

Signed at New York, county and State of New York, this 1st day of December 1927.

WILLIS A. GIBBONS.